United States Patent [19]

Lipman

[11] Patent Number: 6,037,893
[45] Date of Patent: Mar. 14, 2000

[54] ENHANCED MOTION COMPENSATION TECHNIQUE IN SYNTHETIC APERTURE RADAR SYSTEMS

[75] Inventor: Jerome S. Lipman, Sherman Oaks, Calif.

[73] Assignee: Litton Systems, Inc., Woodland Hills, Calif.

[21] Appl. No.: 09/127,011

[22] Filed: Jul. 31, 1998

[51] Int. Cl.[7] .............................. G01S 13/90; G01S 13/86
[52] U.S. Cl. ........................... 342/25; 342/184; 342/190; 342/191; 342/195; 342/357.01; 342/357.06
[58] Field of Search ........................ 342/357.01–357.098, 342/357.11–357.17, 25, 175, 176, 179, 184, 190, 191, 192, 193, 194, 195, 196, 197

[56] References Cited

U.S. PATENT DOCUMENTS

| | | | |
|---|---|---|---|
| 5,327,140 | 7/1994 | Buckreuss | 342/25 |
| 5,659,318 | 8/1997 | Madsen et al. | 342/25 |
| 5,708,436 | 1/1998 | Loiz et al. | 342/25 |
| 5,777,573 | 7/1998 | Klausing et al. | 342/25 |

OTHER PUBLICATIONS

Stimson "Introduction to Airborne Radar," 1983, Hughes Aircraft Company, pp. 527–580.
Lipman at the Institute os Navigation GPS–92 Technical Meeting, Sep. 16–18, 1992 entitled "Tradeoffs in the Implementation of Integrated GPS Inertial Systems".
Lipman et al. at the Precision Strike Technology Symposium, Johns Hopkins University Applied Physics Labratory, Sep. 27–28, 1995, entitled "Tradeoffs and Technical Issues in the Integration of Modern Navigation Systems and Synthetic Aperture Radars".
Lipman at the Precision Strike Technology Symposium, Johns Hopkins University Applied Physics Laboratory Oct. 9–10, 1996, entitled "Millimeter Navigation Performance for High Quality SAR Imaging and Target Location".
"GPS–Kalman–Augmented Inertial Navigation System Performance," by Allan J. Brockstein; NAECON '78 Record; 1978.
"An Experimental Study of an Integrated GPS/INS System for Shallow Water AUV Navigation (SANS)," by R.B. McGhee et al.; Proceedings of 9th Symposium on Unmanned Untethered Submersible Technology; Durham, New Hampshire, 1995.

*Primary Examiner*—Bernarr E. Gregory
*Attorney, Agent, or Firm*—Lynn & Lynn

[57] ABSTRACT

Compensating for motion of the host vehicle in a synthetic aperture radar system includes collecting inertial data with an inertial navigation system during an imaging period in which a synthetic aperture radar pulse is directed to a target. During the imaging period global positioning system corrections to the inertial data are collected. A smooth representation of the global positioning system corrections is formed and then the smooth representation of the global positioning system corrections is applied to the inertial data after completion of the imaging period.

4 Claims, 5 Drawing Sheets

ENHANCED MOTION COMPENSATION TECHNIQUE IN SYNTHETIC APERTURE RADAR SYSTEMS

BACKGROUND OF THE INVENTION

This invention relates generally to signal processing in synthetic aperture radar (SAR) systems. This invention relates particularly to a method for compensating for motion of an aircraft carrying an SAR system. Still more particularly, this invention relates to a method for using global positioning system (GPS) data with an inertial navigation system, (INS) to provide smooth and accurate host vehicle motion compensation.

SAR radar system is described in Stimson "Introduction to Airborne Radar", 1983, Hughes Aircraft Company, pp. 527–580. Integrated INS/GPS systems are described in a paper presented by Lipman at the Institute of Navigation GPS-92 Technical Meeting, Sep. 16–18, 1992 entitled "Tradeoffs in the Implementation of Integrated GPS Inertial Systems". Additional descriptions of integrated INS/GPS systems are described in a paper by Lipman et al. at the Precision Strike Technology Symposium, Johns Hopkins University Applied Physics Laboratory, Sept. 27–28, 1995, entitled "Tradeoffs and Technical Issues in the Integration of Modern Navigation Systems and Synthetic Aperture Radars"; and in a paper by Lipman at the Precision Strike Technology Symposium, Johns Hopkins University Applied Physics Laboratory Oct. 9–10, 1996, entitled "Millimeter Navigation Performance for High Quality SAR Imaging and Target Location." The above-cited papers by Lipman and Lipman et al. are incorporated by reference into the present disclosure as be being background material and an indication of the state of the art in motion compensation in SAR systems.

The image quality of synthetic aperture radar depends on the accurate knowledge of the host vehicle position and the smoothness of the relative change in position error. The use of an integrated INS/GPS system to provide this motion compensation has become an important source of this information.

The use of integrated ring laser gyro inertial system with embedded global positioning system receivers for motion compensation support of synthetic array radar imaging has provided an important advance in picture quality and ability to accurately locate objects. A universal dilemma that confronts high-accuracy SAR applications is how to maintain the increased accuracy that the Kalman filtered GPS data provides the inertial system and minimize the disturbing effects of the steps or discontinuity in inertial data due to Kalman updates.

With the development of high resolution SAR that provides image gathering over longer periods of time and at longer ranges and different frequencies, the need for even higher levels of performance than normally available from an integrated GPS/INS system is now desired. The key navigation requirement for accurate SAR target designation is two-fold: (1) accurate absolute velocity and position, and (2) very smooth low relative position error noise over the image gathering period.

In typical aircraft applications of GPS/INS systems the basic accuracy of the blended (or hybrid) solution is provided by the GPS navigation solution. The INS provides the short term navigation between updates and serves as an aid which raises the navigation system tolerance to jamming and loss of satellite signal. The military aircraft systems are implemented with a Kalman filter and mechanization that was designed to be robust under dynamic conditions and provide updates to maximize system accuracy whenever additional data was received from the satellite. Under integrated GPS/INS operation using precision performance service, navigational performance on the order 5 to 10 meter circular error probable (CEP) and time RMS velocity accuracy of the order of 0.025 meter/second is commonly provided. While this performance and architecture satisfy some of the needs of the SAR targeting operation, it may not always lend itself to other aspects. In particular the quality of the SAR image is a critical function of the noise characteristic in the position data and requires very accurate relative position change during the SAR scene time.

The optimum real time output provided by an INS/GPS system is based on a Kalman filter mechanization. The use of a Kalman filter in a classical implementation introduces discontinuities at the normal discrete updates of GPS information into the smooth inertial data. To avoid this problem methods used have been ad hoc type implementations where the Kalman updates are leaked or bled in to maintain the best real time accuracy and minimize the unnatural disturbance to the smoothness of the inertial data.

An important point has been missed in these types of mechanizations is that is the SAR image is not a true real time application. It is a "near real time" application. The data gathering period prior to an attempt to form an image can be a period of several seconds to a large fraction of a minute or more. During that period it is necessary to provide motion compensation data which can then be altered by various schemes during the image forming process. These schemes are generally referred to as "autofocus techniques" but do not depend on navigation velocity and position accuracy improvement but on other image processing related characteristics.

SUMMARY OF THE INVENTION

A method for compensating for motion of a host vehicle in a synthetic aperture radar system, comprises the steps of (a) collecting inertial data for the host vehicle with an inertial navigation system during an imaging period in which synthetic aperture radar pulses are directed toward a target; (b) collecting global positioning system correction data to the inertial data during the imaging period; (c) forming a smooth representation of the global positioning system corrections; and (d) adding the smooth representation of the global positioning system corrections to the inertial data after completion of the imaging data gathering period during the image forming period. The inertial data may be position or velocity data.

An appreciation of the objectives of the present invention and a more complete understanding of its structure and method of operation may be had by studying the following description of the preferred embodiment and by referring to the accompanying drawings.

DESCRIPTION OF THE PREFERRED EMBODIMENT

Unlike a conventional radar, a SAR system depends on the motion of the host vehicle to greatly enhance its ability to resolve images in the cross line-of-sight direction. The Doppler shift of the transmitted frequency in the reflected signals depends on the location of the reflecting object in the beam of the radar. By further processing the reflected signals into magnitude and phase shifts, the relative position of images in the beam in the cross line of sight direction can be determined.

The amount of time that an object is being illuminated can vary. In the strip map mode the longest time that a target will be illuminated is the amount of time the host vehicle takes to traverse the distance that the beamwidth extends at the target. The need for increased motion compensation performance grows as the range to the scene grows longer and at aircraft lower velocities.

As the host aircraft flies by the area to be imaged, the radar produces a series of pulsed emissions and receives reflections from the images in the beam width. Because of the finite beam width, any particular point will be illuminated a number of times (scene time) during a strip map mode, and all the time during the spotlight mode scene time. With each pulse reflection, the range along the line of sight to any particular point changes. Thus the Doppler shift of the return pulse from that point will vary according to the component of the aircraft velocity vector along the line of sight to any reflector at that point.

Thus, for each pulse, the return signal can be broken up into range and Doppler bins. The intensity of the return signal for each bin is related to the image reflectance. By combining all the range and Doppler bin data (keeping proper account of the relative position and velocity vector of the aircraft during the scene time) an image can be formed of the area that had been illuminated.

Figure 1:
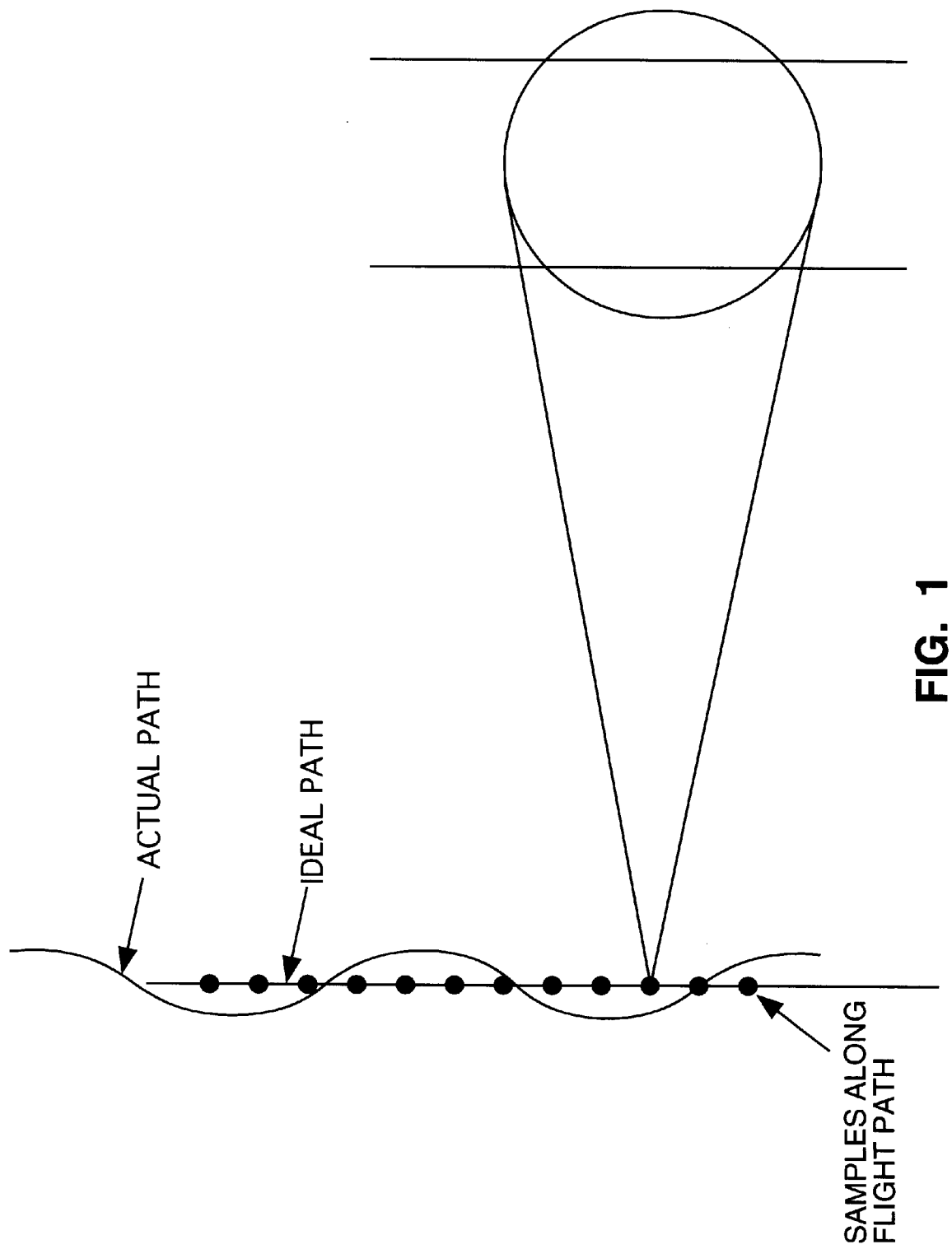
FIG. 1 indicates deviations from an ideal strip map flight path by an SAR host aircraft.

As indicated in FIG. 1, a host aircraft carrying an SAR antenna ideally should follow a straight line flight path for the strip map mode. The host aircraft ideally should also have a constant velocity vector as the antenna sends out radar pulses aligned at a fixed angle of 90° relative to the ideal flight path. Although FIG. 1 shows the radar pulses at 90° relative to the flight path, it is well known in the art that the radar beam can be pointed forward. The antenna sends out pulses of fixed duration at regular intervals as indicated on the line representing the ideal path.

However, because of wind, limitations in the accuracy of the control system and other factors associated with flying an airplane, the host aircraft deviates from the ideal straight line, constant velocity motion. Deviations from the ideal motion cause errors in the reflected radar phase data that is stored in the range/doppler bins.

Figure 2:
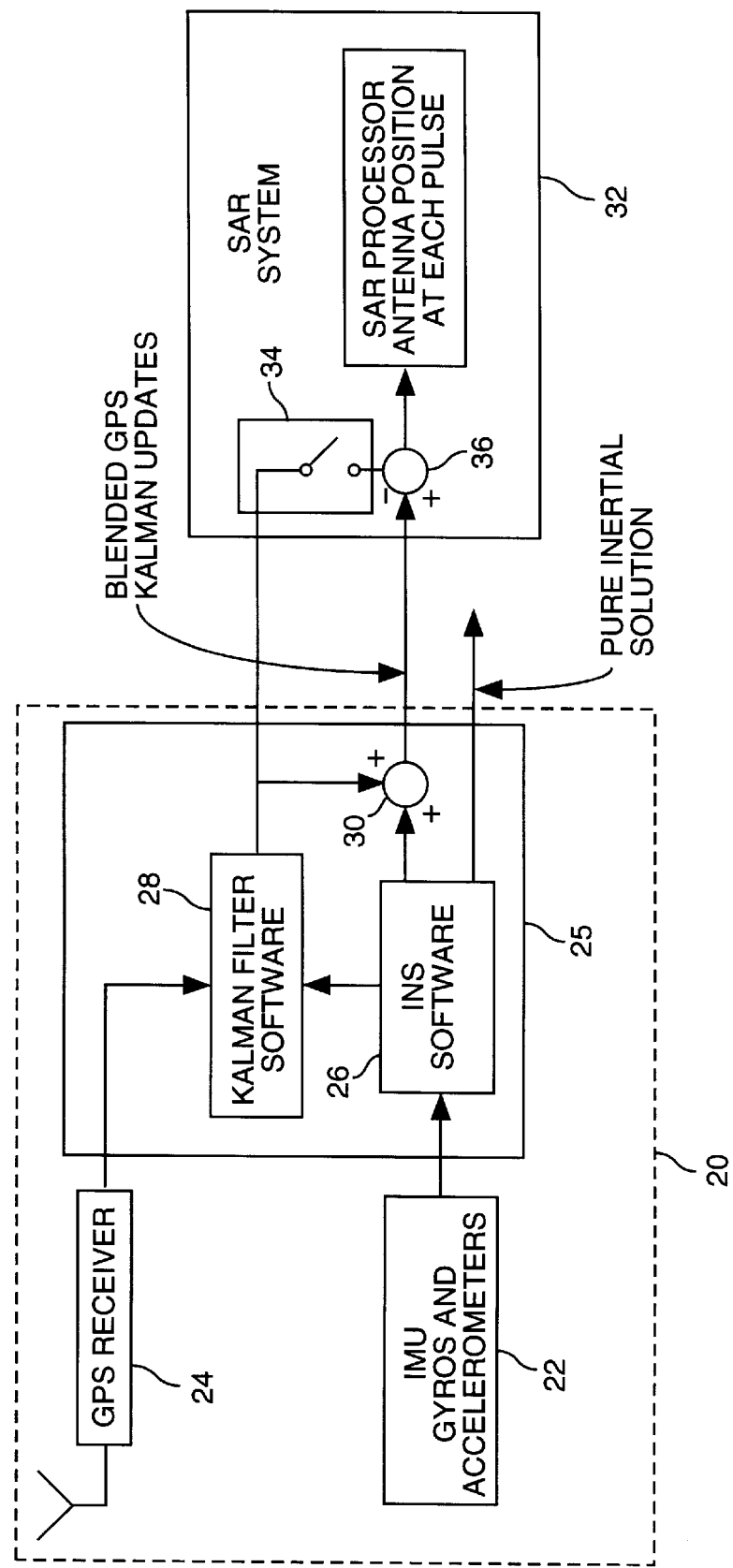
FIG. 2 is a block diagram of an integrated GPS/INS system.

FIG. 2 is a block diagram of an integrated NS/GPS system 20 that is carried by the host aircraft. The integrated INS/GPS system 20 includes an inertial measurement unit (IMU) 22 and a GPS receiver 24. The INS section 22 includes inertial sensors (not shown) that provide data on the angular rate and acceleration of the host. The inertial sensors typically include a three-axis ring laser gyroscope system (not shown) and suitable accelerometers (not shown) all of which are well-known in the art. The inertial data is processed to provide a stand-alone inertial navigation output that is used to measure the actual flight path as accurately as possible. Signals output from the IMU 22 are input to a central processing unit (CPU) 25 that includes INS software 26 and a Kalman filter 28. The INS software 26 provides a pure inertial solution for the actual flight path of the host aircraft.

The output of the GPS receiver 24 is input to the Kalman filter 28. The Kalman filter 28 is a recursive update technique for determining the correct parameters for the mathematical model of an event or process. Initial estimates of parameter values and errors in the estimates are used to calculate the terms of a matrix. The errors between parameter estimates and the measured data are determined. The errors are then multiplied by the matrix to provide updated estimates of what the parameters and the errors should be. The prior art contains numerous descriptions of the Kalman filter algorithm.

The GPS receiver 24 periodically receives precision service GPS signals that locate the position of the host aircraft to within about a 10 meter CEP and provide host aircraft velocity to 0.05 meters/second. The GPS signals are input to the Kalman filter 28, which calculates corrections to the position and velocity data from the INS section 22. The GPS corrections are then applied to the inertial data in real time by a summer 30 that is included in the CPU 25. The output of the summer 30 provides the GPS/inertial blended navigation solution containing discrete Kalman updates to the inertial velocity and position. The corrected position data is input to an SAR system 32, which produces the well-known SAR images.

To maintain smooth velocity/position derived data, GPS velocity and position arrived Kalman updates are removed during the imaging period. Thus over longer imaging periods, the navigation solution gradually degrades. The update outputs of the Kalman filter 28 is input to a switch 34 in the SAR system 32. The blended GPS/INS solution with Kalman updates is input to a summer 36 in the SAR system 32. When the switch 36 is closed, the Kalman updates are removed from the blended GPS/INS solution. The output of the summer 36 is applied to apparatus in the SAR system 32 that tracks the position of the SAR antenna at each radar pulse output.

Figure 5:
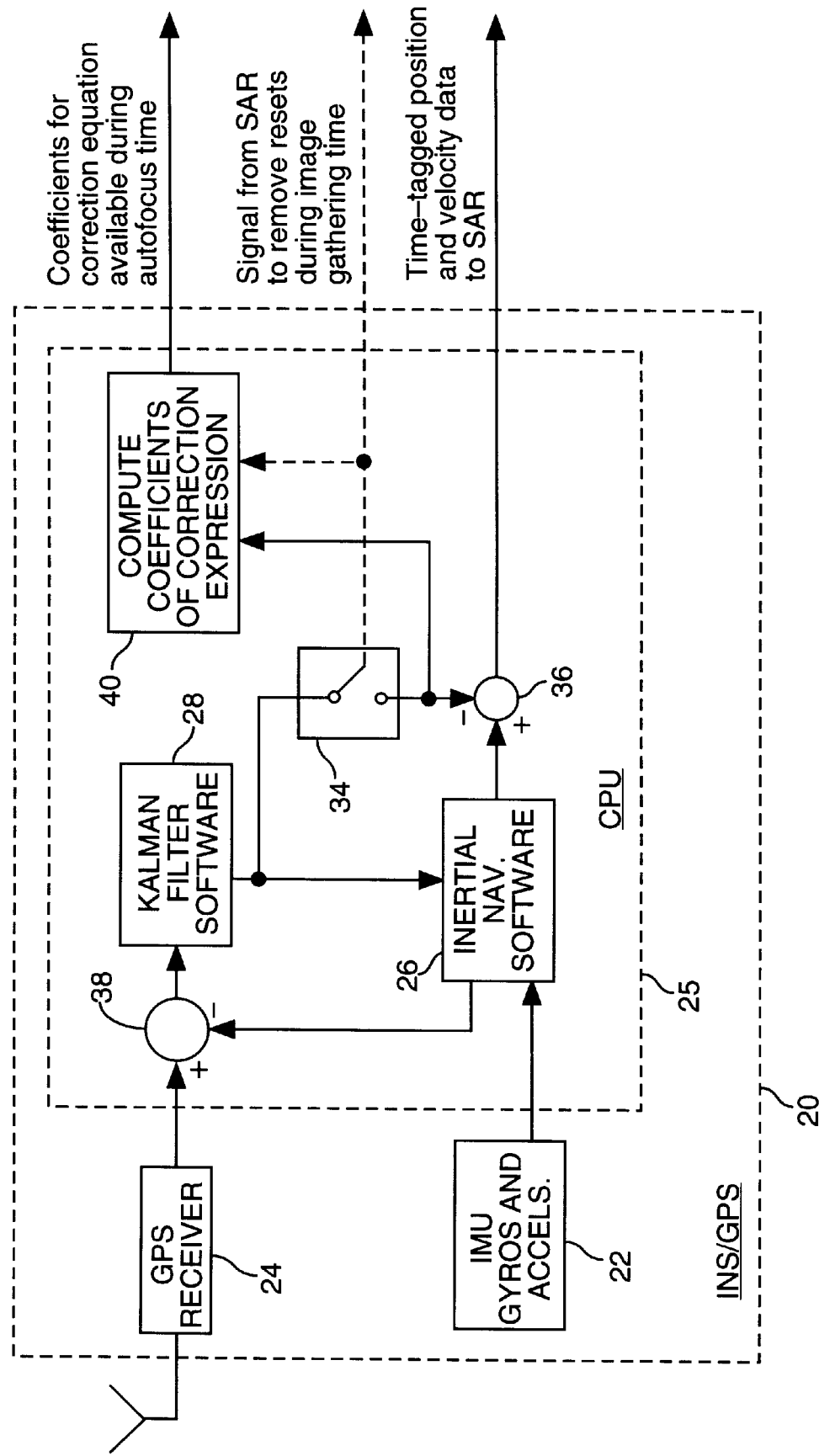
FIG. 5 is a block diagram of an integrated GPS/INS system enhanced for compensating for motion of the host aircraft.

FIG. 5 illustrates an embodiment of the enhanced motion compensation technique according to the present invention. A summer 38 receives signals from the GPS receiver 24 and from the INS software 25. The signal from the INS software 25 is subtracted from the GPS signal to determine the difference between the GPS data and inertial data. Signals output from the summer 38 are input to the Kalman filter 28. The Kalman updates from the Kalman filter 28 are input to the INS software 25 and to the switch 34 for input to the summer 36. The output of the summer 36 is time-tagged position and velocity data for input to the SAR.

The switch 34 operates under the control of a signal from the SAR system. The control signal from the SAR actuates the switch 34 to remove the Kalman resets during the image gathering time. The control signal opens the switch 34 at the end of image data gathering time. When the switch 34 is closed, a signal processor 40 receives the Kalman updates from the Kalman filter 28. The signal processor 40 calculates coefficients for a correction equation. During the imaging or autofocus time, the correction coefficients from the signal processor 40 are applied to the time-tagged position and velocity data to provide smoothed motion compensation data for forming the SAR image.

The enhanced motion compensation correction (EMC) technique according to the present invention takes full advantage of the fact that motion compensation data is not real time to provide the most smooth and accurate inertial data the can be provided over the image period.

Figure 3:
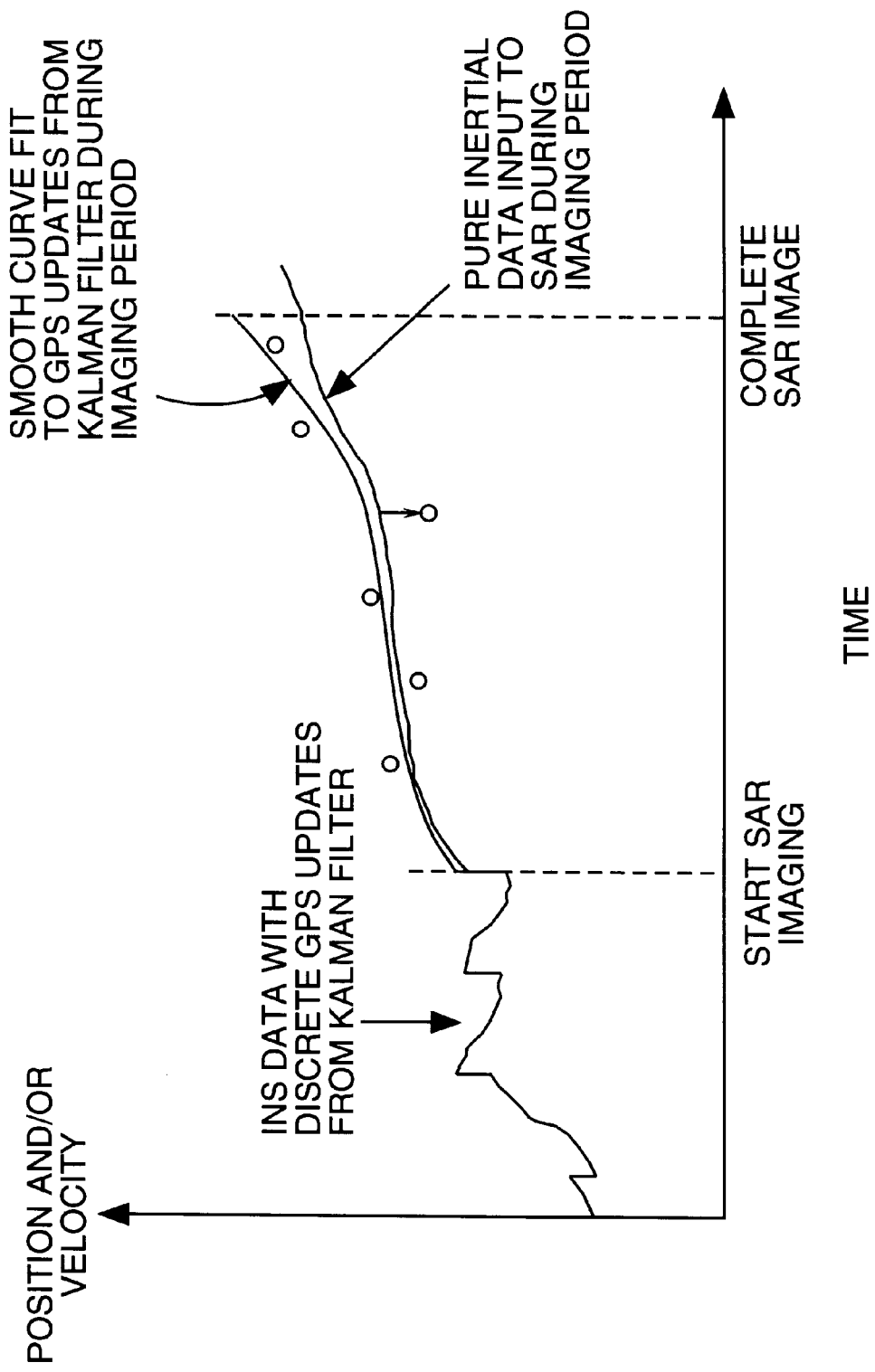
FIG. 3 graphically illustrates the position of the host aircraft as a function of time.

Referring to FIG. 3, the smooth portions of the graph show the position of the host aircraft as indicated by the INS section 22. The vertical line portions of the graph indicate the discrete updates in position provided by the Kalman filter 26. The graph includes a time interval where the SAR image is formed between an image start time and a stop time.

Figure 4:
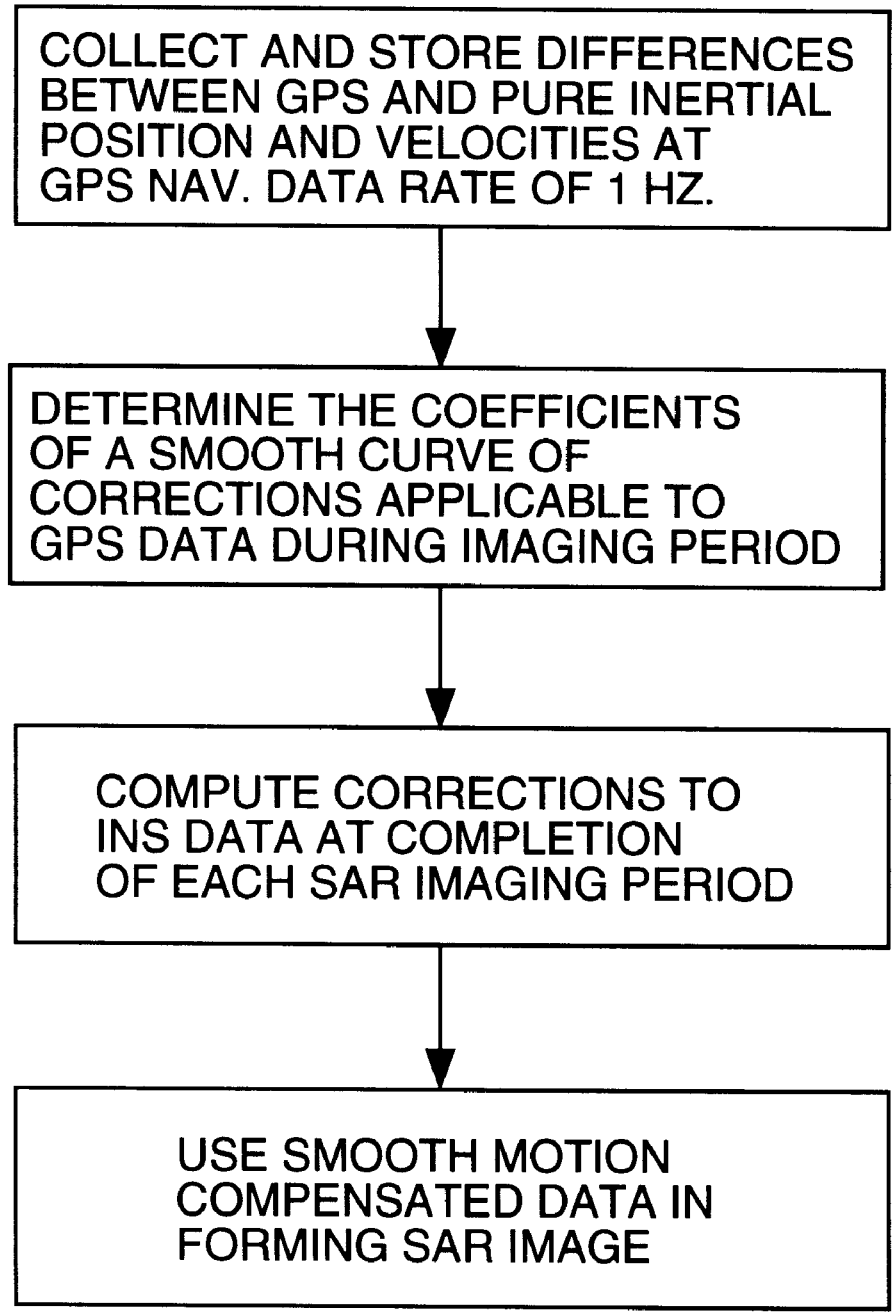
FIG. 4 is a flow chart of the method according to the present invention for determining an enhanced motion compensation.

The motion compensation technique according to the present invention is explained with reference to the flow diagram of FIG. 4. During the data gathering imaging period the SAR utilizes pure inertial position data from the INS section 22. During the data gathering period the position is not reset by the GPS satellite corrections. Pseudo range and delta range observations are made at selected intervals. Hence this initial data is as smooth and noise free as can be produced. However, the data is subject to sensor biases and state variable errors, which are a source of image distortion.

The system collects and stores the differences between the GPS and the pure inertial position and velocities at the GPS rate of one Hz. The GPS position corrections are stored for each data acquisition time for subsequent application to the inertial position data. The GPS corrections are shown as circles on the graph of FIG. 3. The GPS corrections are a series of discrete numbers. As has been noted, direct application of the GPS corrections to the inertial data produces discontinuities that degrade the SAR image.

The signal processor 40 determines the coefficients of a smooth curve of corrections applicable to the GPS data during the imaging period. Thus a smooth correction to the inertial data is provided. For example, techniques such as a least squares fit, power series and other curve fitting techniques may be used to make a smooth representation of the GPS corrections.

The continuous inertial position corrections produced by this discrete inertial error model as a function of time take full advantage of the GPS accuracy and are just as smooth as the initial data. These corrections are then applied as phase corrections to the SAR data during the image forming process. Further, this data is inherently more accurate than the Kalman filtered data would have been because this correction technique represents an equivalent smoother rather than a filter.

The description of the invention refers to position data. The method according to the present invention also is applicable to processing velocity data.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method using an integrated inertial navigation system (INS) and global positioning system (GPS) for compensating for motion of a host vehicle in a synthetic aperture radar system, comprising the steps of:

collecting inertial data for the host vehicle with the inertial navigation system during an imaging period in which a synthetic aperture radar pulse is directed to a target without resetting the position data for the host vehicle with the GPS during the imaging period;

collecting global positioning system corrections to the inertial data during the imaging period;

forming a smooth representation of the global positioning system corrections; and adding the smooth representation of the global positioning system corrections to the inertial data after completion of the imaging period to obtain a corrected position for the host vehicle.

2. The method of claim 1 wherein the inertial data indicates the position of the host vehicle.

3. The method of claim 1 wherein the inertial data indicates the velocity of the host vehicle.

4. A system for compensating for motion of a host vehicle in a synthetic aperture radar system, comprising:

an integrated INS/GPS navigation system that includes a GPS receiver and an inertial measurement unit (IMU);

a CPU arranged to receive signals from the GPS receiver and from the IMU, the CPU including:

inertial navigation software that provides inertial data for the position and velocity of the host vehicle;

a first summer arranged obtain the difference between the inertial data and signals from the GPS receiver;

a Kalman filter arranged to process the difference between the inertial data and signals from the GPS receiver and provide Kalman updates to the inertial data to the IMU;

a switch arranged to receive the Kalman updates from the Kalman filter;

a second summer connected to the IMU to receive Kalman updated inertial data therefrom, the second summer being also connected to the switch, the switch being actuated by the SAR to provide the Kalman updates to the second summer during image gathering times of the SAR, such that during image gathering times the second summer removes the Kalman updates from the previously updated inertial data and provides time-tagged position and velocity data for the host vehicle to the SAR; and a signal processor arranged to receive the Kalman updates from the switch output and calculate coefficients for a smooth correction equation to the motion of the host vehicle based upon the Kalman updates.

\* \* \* \* \*